Jan. 5, 1926.

O. H. PIEPER ET AL

1,568,085

UNITARY LIGHT PROJECTING APPARATUS

Filed Sept. 15, 1920

INVENTORS
Oscar H. Pieper
Alphonse F. Pieper
BY Frederick F. Church
Their ATTORNEY Jan. 5, 1926.  
O. H. PIEPER ET AL  
1,568,085  
UNITARY LIGHT PROJECTING APPARATUS  
Filed Sept. 15, 1920  6 Sheets-Sheet 4

INVENTORS  
Oscar H. Pieper  
BY Alphonse F. Pieper  
Frederick F. Church  
their ATTORNEY Jan. 5, 1926.　　　　　　　　　　　　　　　　　　　1,568,085
O. H. PIEPER ET AL
UNITARY LIGHT PROJECTING APPARATUS
Filed Sept. 15, 1920　　　　6 Sheets-Sheet 5

INVENTORS
Oscar H. Pieper
Alphonse F. Pieper
BY Frederick F. Church
their ATTORNEY Patented Jan. 5, 1926.

1,568,085

UNITED STATES PATENT OFFICE.

OSCAR H. PIEPER AND ALPHONSE F. PIEPER, OF ROCHESTER, NEW YORK.

UNITARY LIGHT-PROJECTING APPARATUS.

Application filed September 15, 1920. Serial No. 410,468.

*To all whom it may concern:*

Be it known that we, OSCAR H. PIEPER and ALPHONSE F. PIEPER, citizens of the United States, of the city of Rochester, in the county of Monroe and State of New York, have invented certain new and useful Improvements in Unitary Light-Projecting Apparatus; and we do hereby declare the following to be a full, clear, and exact description of the same, reference being had to the accompanying drawings, forming a part of this specification, and to the reference numerals marked thereon.

This invention has to do with light projecting apparatus and relates more particularly to means providing for the convenient support and operation of a source of light, such, for example, as an X-ray tube, the term "light" being used herein in a broad sense including not only rays of a character adapted to render an object visible by reflection but also of electro-magnetic radiation. One object of the invention is to provide an apparatus for the purposes specified of a self-contained, portable character adapted for convenient location in use, which is compact, rigid and generally practical in construction, and which affords a maximum of flexibility in the support of the light source, so that the latter may be located in practically any position. A further object is the provision of an apparatus of the above character having parts for supporting the light source so constructed and arranged that they may be quickly and accurately adjusted in position with the least effort while effectively protecting the operator and patient against the danger of shock from contact with electrical connections.

To these and other ends the invention consists in certain improvements and combinations of parts all as will be hereinafter more fully described, the novel features being pointed out in the claims at the end of the specification.

In the drawings.

Similar reference characters throughout the several views indicate the same parts.

The embodiment of the invention herein disclosed by way of illustration of the principles involved is adapted primarily for use in dental work in taking radiographic or X-ray photographs of the patient while seated in a dental chair, but the novel features of the invention are widely applicable to the various other uses for which this class of apparatus may be employed. The relatively small room space usually available for dentists, and the increasing complexity and size of the necessary working equipment has made necessary the provision of compact, self-contained apparatus occupying a minimum of space and preferably adapted to be readily moved from one position to another as occasion may require. To this end the present embodiment comprises generally a portable cabinet of substantially rectangular shape ornamentally constructed of paneled wood or metal and containing the various electrical operating devices for the apparatus. The cabinet also contains means for slidably supporting an upwardly extending standard which is telescopically movable into and out of the cabinet, and is provided with a plurality of movably connected parts for flexibly supporting the light source or X-ray tube for substantially universal movement. The standard and connected parts are arranged to overhang the dental chair from behind where the apparatus is least in the way of the dentist and convenient to locate free from interference with the parts of the chair and the other usual dental appliances. The standard also carries the high voltage and other electrical connections advantageously disposed with a view to convenience and safety to the person, thus obviating the use of fixed elevated posts or other overhead supporting means for such connections, the apparatus being thus portable, compact and self-contained or unitary in character.

Figures 1, 2:
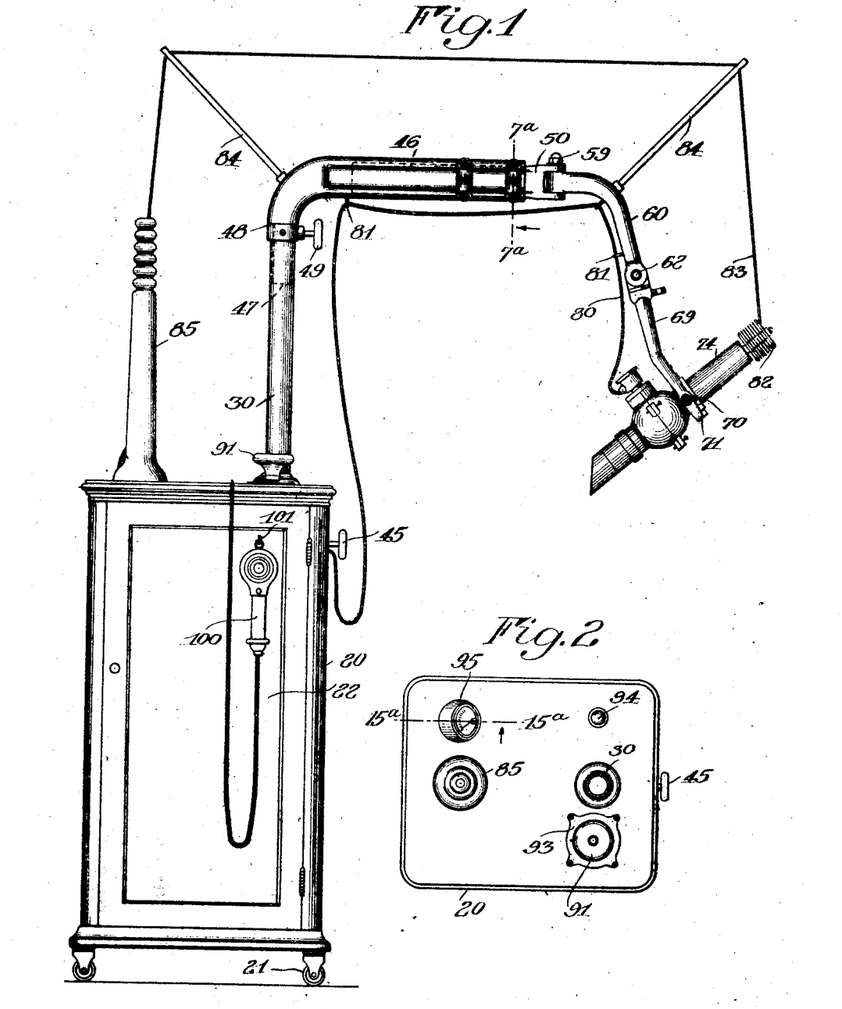
Figure 1 is a front elevation of an apparatus embodying the present invention.
Figure 2 is a top plan view of the same with the standard in section.
Figure 3:
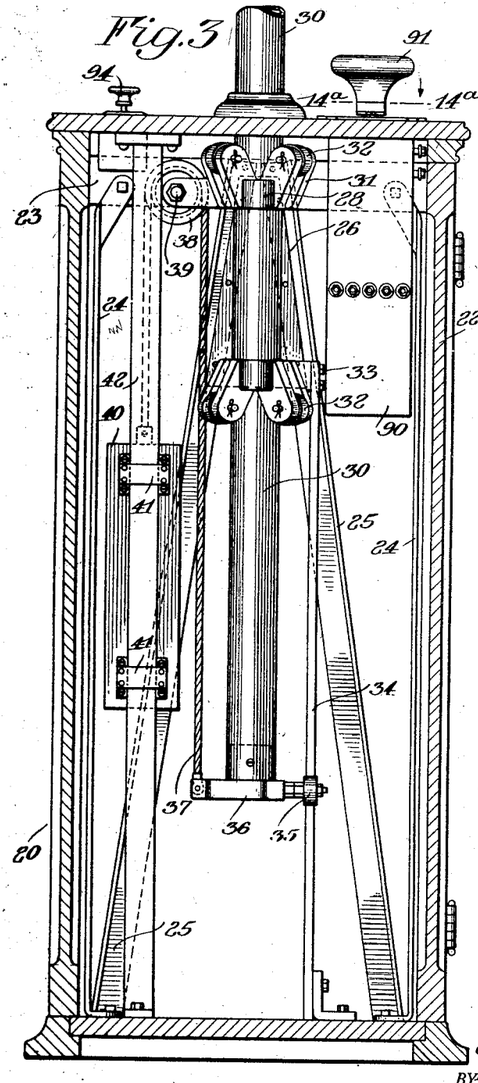
Figure 3 is an enlarged sectional elevation of the cabinet and parts therein substantially on the line $3^a$—$3^a$ of Figure 4.
Figures 4, 14:
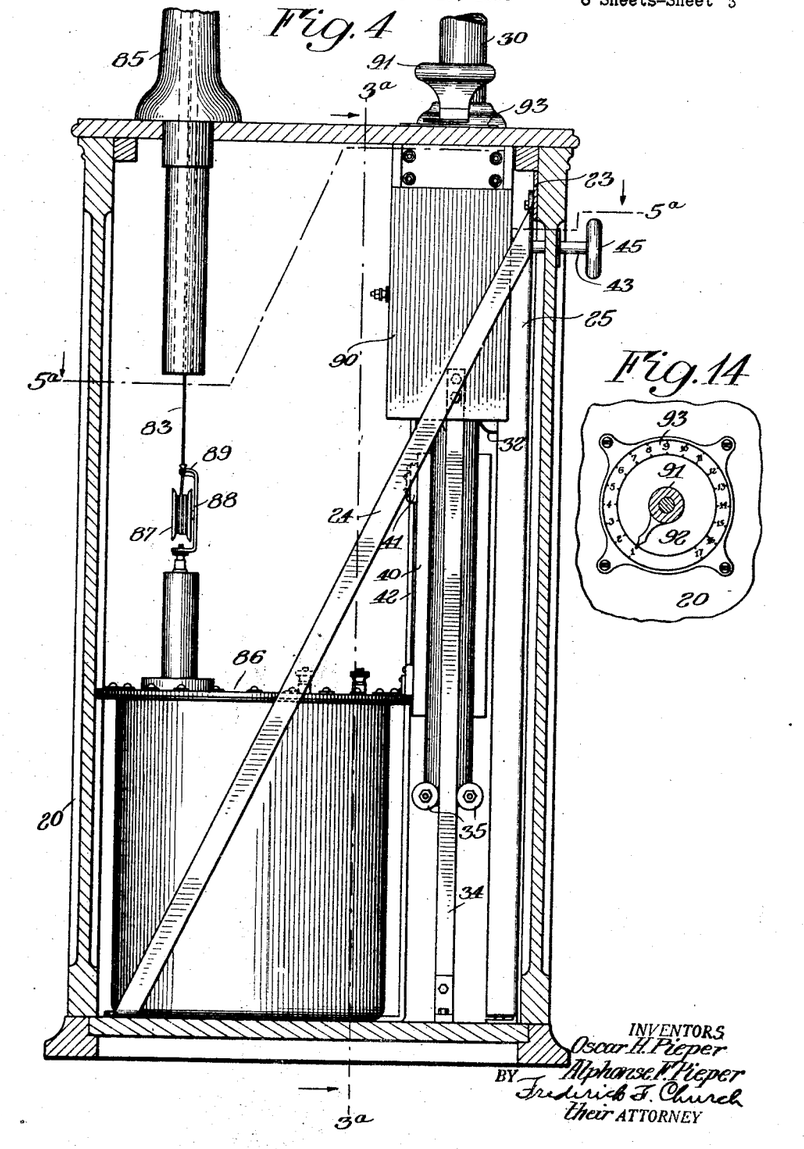
Figure 4 is a similar view on the line $4^a$—$4^a$ of Figure 5.
Figure 14 is a horizontal section on the line $14^a$—$14^a$ of Figure 3 showing the auto-transformer controller.
Figure 5:
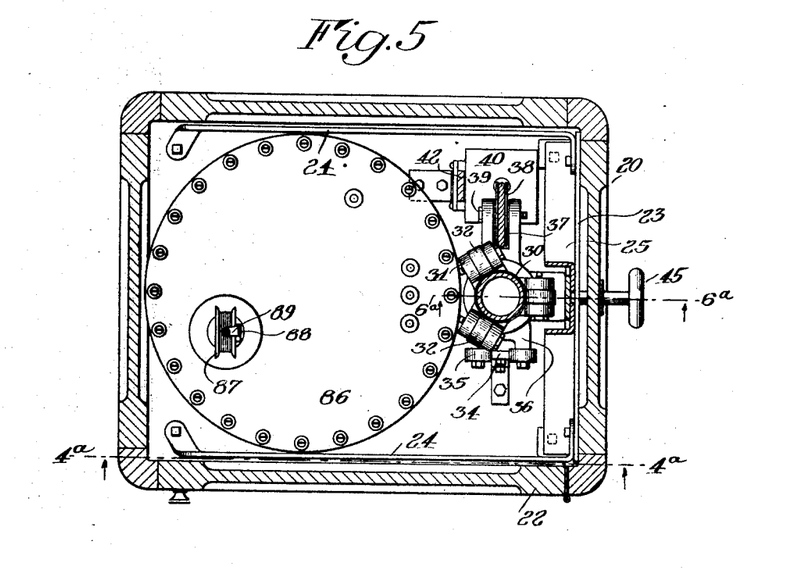
Figure 5 is a horizontal sectional view of the cabinet substantially on the line $5^a$—$5^a$ of Figure 4.
Figure 6:
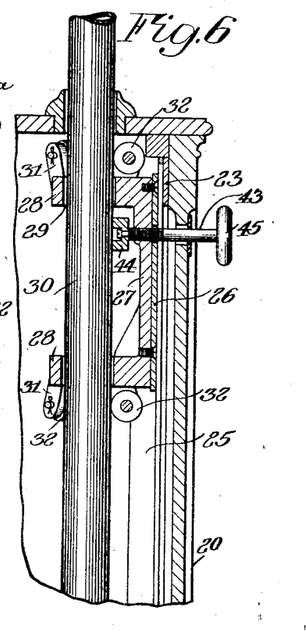
Figure 6 is a detailed sectional elevation on the line $6^a$—$6^a$ of Figure 5, showing the standard supporting and clamping means.

Referring to the drawings and more particularly to Figure 1 thereof, the cabinet is indicated generally at 20, supported on rollers 21 so that it may be conveniently wheeled where desired and positioned for use. A hinged door 22 forming the front side of the cabinet affords convenient access to the interior thereof. The means for adjustably supporting the standard and parts carried thereby comprises, preferably, a transverse metal plate 23, secured to the top of the inside of the right hand wall of the cabinet, Figures 4, 5, and 6, to the ends of which plate are riveted or bolted inclined brace bars 24. the other ends of which are bolted to the floor of the cabinet on the opposite side of the latter. Attached to the plate 23 also, adjacent its center, are angle bars 25, the lower ends of which are spread apart and secured to the floor of the cabinet on the same side of the latter. The bars 25 have bolted or riveted thereto between their upper ends a plate 26 which is thus securely and rigidly carried and serves as a support for a frame 27 attached thereto and having at its top and bottom outwardly extending portions 28 provided with openings 29 in which freely slides the vertically extending standard portion 30 of metal tubing forming the support for the X-ray tube. Portions 28 are provided with pairs of spaced parallel lugs 31 between each pair of which is rotatably carried a roller 32 engaging the standard, these rollers at the top and bottom of frame 27 being spaced about the standard preferably in sets of three in rolling engagement therewith so that the latter is rigidly guided and supported but freely movable in a longitudinal direction with little friction. Fixed to the lower end of 27 as at 33, Figure 3, is a guide bar 34 extending vertically downward and secured at its lower end to the floor of the cabinet, and in rolling engagement with the opposite sides of this bar are rollers 35 journaled on a crosshead 36 on the bottom of the standard by which means the latter is held against rotation relative to the cabinet.

For the purpose of counterbalancing the weight of the standard and the parts carried thereby the cross head 36 at the bottom thereof preferably has secured thereto the flexible member or cord 37 extending upwardly and over a pulley 38 rotatably carried on a spindle 39 supported by lugs on the upper end of frame 27. Passing downwardly from the pulley, member 37 is fixed to the upper end of a weight 40 having keepers 41 embracing a vertically arranged guide bar 42 fixed at its ends to the top and bottom of the cabinet, the weight 40 thus having a guided vertical movement and counterbalancing the standard so that the latter is easily moved up and down by hand, telescopically into and out of the cabinet. Means are also provided for clamping the standard in the desired position of adjustment comprising preferably a clamping spindle 43, Figure 6, extending through the side of the cabinet and through frame 27 in threaded engagement with the latter, and having on its inner end a shoe 44 adapted to be forced into frictional engagement with the standard by rotation of spindle 43 as by means of a convenient handle 45 at the outer end of the latter.

The standard is preferably extended to overhang the dental chair from behind and to this end is provided with a substantially horizontal lateral extension 46 having a reduced end 47, Figure 1, rotatably fitted in the upper end of the tubular portion 30 of the standard, with a shoulder 48 engaging the top of the latter, by which means the extension 46 is pivotally supported so that it may be swung to any convenient position, a clamping spindle 49 of any suitable construction being provided to secure the extension in the desired position of adjustment.

Figures 7, 10, 11:
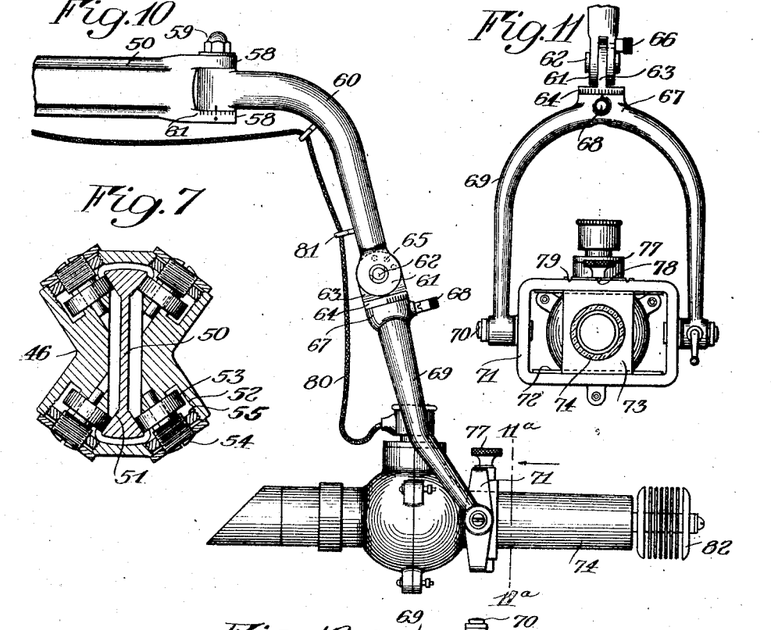
Figure 7 is a sectional elevation on the line $7^a$—$7^a$ of Figure 1 of the lateral extension of the standard.
Figure 10 is a side elevation, enlarged, of parts of the means for supporting the light source.
Figure 11 is an end elevation of the same as seen from the line $11^a$—$11^a$.
Figures 8, 9, 12:
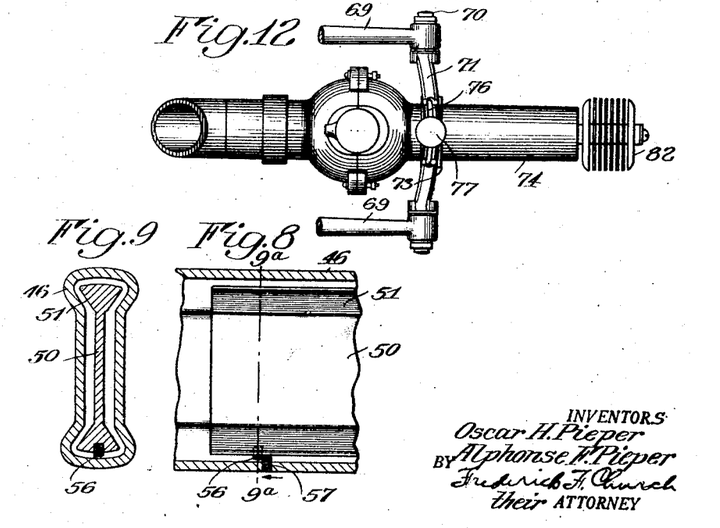
Figure 8 is a fragmentary vertical longitudinal section of the same showing a stop device therefor.
Figure 9 is a section on the line $9^a$—$9^a$ of Figure 8.
Figure 12 is a top plan view of the parts shown in Figure 11.
Figure 13:
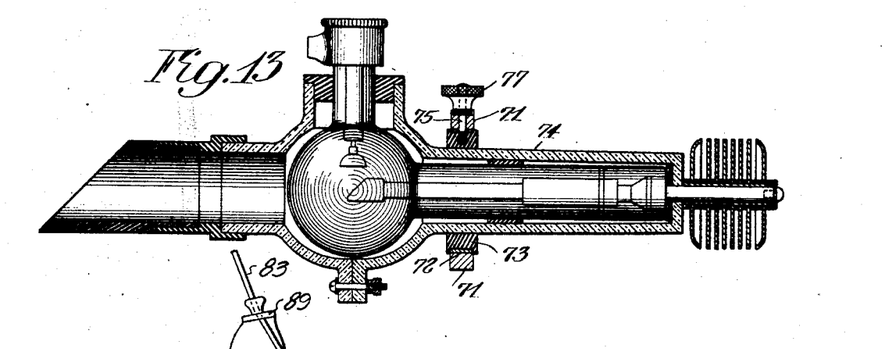
Figure 13 is a longitudinal vertical section through the light source or X-ray tube.

The standard extension 46 is preferably of the hollow construction and shape shown in Figure 9 and adapted to telescopically receive a section 50 of plate like shape with bearing flanges 51 at its upper and lower edges. Section 46 at spaced points thereof is formed with a plurality of recesses 52. Figure 7, provided with bearings in which are journaled bearing rollers 53 held in place by screws 54 threadedly engaging openings in discs 55 having threaded engagement with the sides of the recesses 52. Rollers 53 bear on the respective flanges of section 50 and support the latter for substantially frictionless telescopic sliding movement in extension 46, a stop screw 56, Figure 8, being provided at the inner end of the section for engagement with a similar stop 57 carried by the extension to limit the outward movement of the section.

In order that the X-ray tube, when once adjusted to direct its rays toward an anatomical center such, for example, as the center of curvature of a patient's jaw, may be conveniently adjusted about such center to a plurality of radial positions as may be desirable for projecting the rays upon different teeth, by adjustment of the tube support at but a single point, the outer end of section 50 is formed with a so-called radial center comprising vertically spaced bearing lugs 58 in which is carried a spindle 59 on which is rotatably supported a part 60 of angular shape with its lower end extending in a downwardly inclined direction. Spindle 59 preferably has threaded engagement with lower lug 58 or is otherwise suitably constructed so that a slight pressure may be brought to bear on the part 60 to impose a frictional resistance to the rotation of the latter sufficient to hold it in adjusted position but permitting convenient movement thereof by hand as may be desirable, so that no clamping and unclamping of the pivotal connection is necessary in the adjustment of the part. The latter and the lower lug 58 are preferably provided with cooperating graduations so that the part may be accurately located in any predetermined position. The lower end of part 60 is preferably bifurcated and provided with bearing lugs 61 carrying a spindle 62 on which is pivotally carried lug 63 of a second part 64 which is thus mounted for movement in a vertical plane. Lug 63 is preferably provided with a series of recesses 65 with which is adapted to selectively cooperate a stop or pin 66 carried by one of the lugs 61 so that part 64 may be locked in one of a plurality of positions, for a purpose which will presently appear.

Part 64 is preferably formed with a reduced portion or trunnion (not shown), extending downwardly perpendicular to the pivotal axis 62 and having rotatably mounted thereon a forked arm 67, Figure 11, which is thus rotatable about an axis substantially parallel with the direction of extent of part 64. Arm 67 is provided with an opening carrying a stop or pin 68 the inner end of which is adapted to cooperate in any suitable manner with recesses in the trunnion for the purpose of securing arm 67 in the desired position of adjustment. The arm has branching portions 69 the ends of which are formed with bearings in which are carried trunnions 70 rotatably supporting a frame or yoke 71 of substantially rectangular shape and provided on the inner surface of its upper and lower sides with guide ways 72 on which slides a plate-like holder 73 for the source of light or X-ray tube. The holder has a central opening in which the tube is frictionally held at its center of gravity and the trunnion bearings of yoke 71 are preferably constructed to provide a yielding frictional resistance to pivotal movement of the yoke so that while the tube may be easily adjusted by hand to the desired positions it is retained by friction in such positions. The top and bottom of the holder plate 73 are preferably grooved for engagement with the guideways 72 so that the holder may be slid lengthwise of the yoke for a distance of several inches. The upper side of the holder has fixed therein a stud 75 extending upwardly through a slot 76 in the top of the yoke and the stud carries at its upper end a spring actuated finger piece or button 77 having a pointed projection 78 adapted to be engaged in one of a plurality of notches 79 in the upper surface of the yoke for accurately locating the holder and tube in a central and in right and left hand positions. As best shown in Figure 12, the yoke is formed in its vertical plane on an arc having a radius substantially equal to the distance of the yoke from the object to be illuminated in the normal operating position of the tube, so that guideways 72 are formed on an arc adapted to be arranged in substantially concentric relation with a portion of said object. It is apparent from the above construction that the tube may be readily moved to its right and left hand positions in the yoke in succession for the purpose of illuminating the object at different angles for making stereoscopic views thereof.

The standard and its associated parts carry, in addition to the tube, the electrical connections between the latter and the operating devices within the cabinet, comprising a cord 80 containing the circuit wires for the filament of the tube, trained closely along the standard by means of hooks or eyes 81 on the latter, and passing into the side of the cabinet. The X-ray tube is, in the present instance, of the "Coolidge" type and connected with the target or anode bar 82 of the tube is the high tension line 83ª supported in spaced relation with the standard by means of struts 84 of wood or other suitable insulating material preferably fixed in the part 60 and in the lateral extension 46 of the standard, the wire thence passing into the upper end of an insulating tube 85 on the top of the cabinet down which it descends to the high tension transformer 86, Figure 4, on the floor of the cabinet. Supported on the transformer casing is a spring actuated pulley or reel 87 for the high tension wire rotatably carried on a conducting arm 88 and electrically connected with and through the latter to the secondary winding of the transformer. The upper end of the arm 88 is provided with an extension 89 over the pulley having an eye through which the wire is threaded to guide the same. As the standard is raised or lowered or its parts adjusted the high tension wire 83 is paid out or taken up automatically by the reel so as to maintain the same at all times in a taut condition and at a sufficient insulating distance from all conducting parts. It is to be noted also that the high tension line is supported at all points on the side of the standard and tube opposite the patient and at points well spaced from the various adjusting means so that the patient and the operator of the machine are guarded against the danger of electrical shock.

Figure 15:
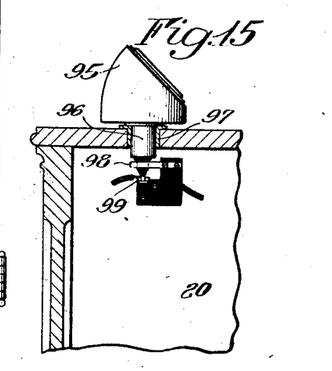
Figure 15 is a vertical section on the line $15^a$—$15^a$ of Figure 2, showing the milliammeter and connections.

At 90 within the cabinet is indicated the casing for the so-called auto-transformer and associated electrical devices. A rotary handle 91 extending through the top of the cabinet is connected with the contact arm of the auto-transformer for the purpose of adjusting the latter and carries a pointer 92 movable over a scale 93 on the top of the cabinet for indicating the position of adjustment. At 94 on the top of the cabinet is a handle for opening and closing the main operating switch. At 95 is the milliammeter employed to indicate the proper adjustment of the auto-transformer for regulating the voltage applied to the apparatus, the meter being carried on a sleeve 96 rotating in a bearing 97 in the top of the cabinet so that it may be adjusted to any convenient reading position for the operator. The sleeve 96 preferably contains insulating conducting tubes one within the other with which cooperate brushes 98 and 99, Figure 15, connected with the apparatus as indicated hereafter. At 100 on the front of the cabinet is a time switch of the usual or any suitable character conveniently supported on a hook 101 so that it may be removed and carried by the operator to the position from which he prefers to observe the operation. As well known in the art, the time switch contains mechanism capable of being set for automatically terminating the application of voltage to the tube after a predetermined number of seconds of exposure depending upon the thickness of the anatomical parts to be penetrated and other conditions, and as this switch forms no part of the present invention, further description appears unnecessary.

Figure 16:
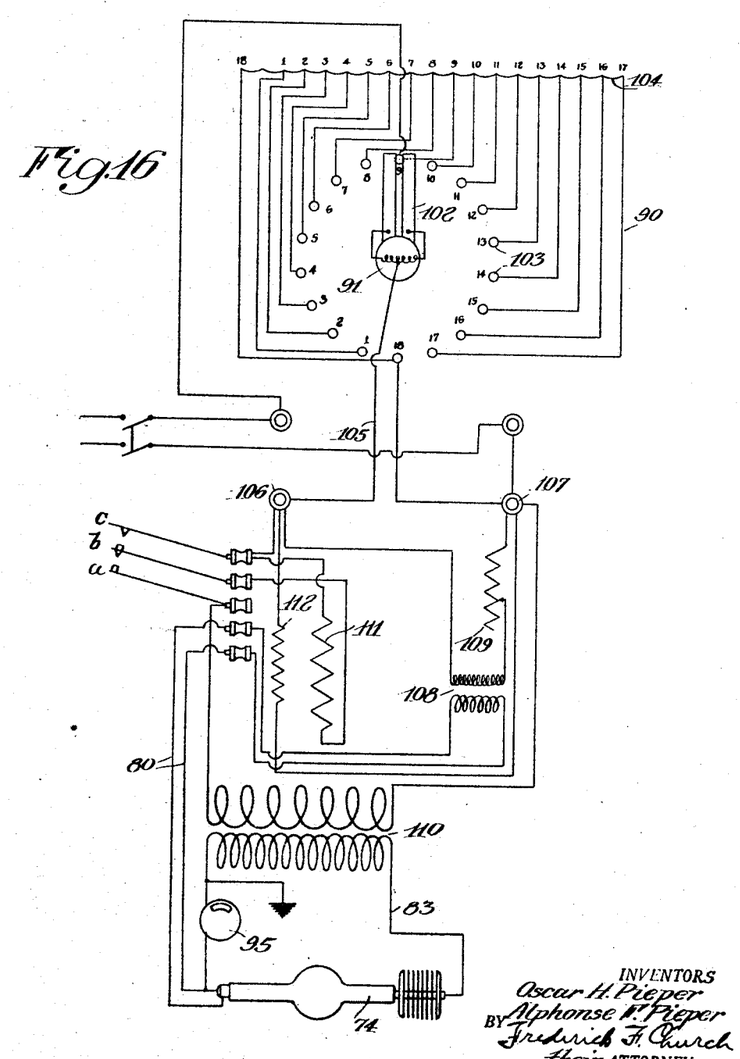
Figure 16 is a diagram of the electrical connections.
Figure 17:
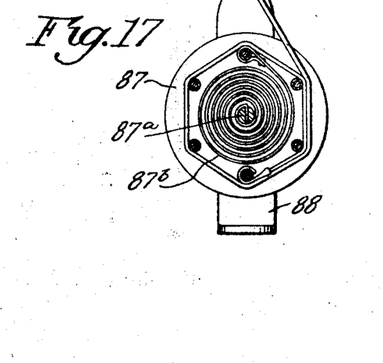
Figure 17 illustrates the spring actuation of the reel for retracting the electrical connection.

Figure 16 illustrates diagrammatically the electrical connections. The auto-transformer 90 is shown as comprising contact arms 102 movable by means of the controlling handle 91 over a plurality of contacts 103 connected at various points with the coil 104 of the transformer. The contact arms 102 are connected by means of the lead 105 with a distributing post 106. At 107 is a similar distributing post connected through the main switch with one side of the line and with one end of the coil of the auto-transformer, the other side of the line being connected through the main switch with the center of the transformer coil so that the line voltage may be raised or lowered as may be found necessary. At 108 is the transformer for the filament of the tube, the primary of this transformer being connected across the distributing posts 106 and 107 in series with a filament control element 109. The secondary of the transformer 108 is connected through the cord 80 described above with the filament of the tube. The cord also carries the low voltage return connection from the tube through the milliammeter to a ground connection and to the secondary coil of the high tension transformer 110. The primary coil of the high tension transformer is connected at one end with the post 107 and at the other with the contact $a$ of the time switch. The latter preferably contains two other contacts, one $b$ connected directly with one end of a regulating resistance 111, the other end of which is connected with the third contact $c$ of the time switch which is also connected with post 106. The three contacts of the time switch are adapted to be brought into contact with each other in the above order so that the resistance 111 is included when the connection with the high tension transformer is completed and subsequently short circuited, and the contacts are automatically broken at the end of the predetermined number of seconds of exposure in the reverse order for the same purpose. At 112 is a regulating resistance connected across the posts 106 and 107. As the electrical system of connection is one well known in the art and forms no part of the present invention, further description thereof appears unnecessary.

In operation the cabinet is readily wheeled back of the dentist's chair or to other convenient position for use and the standard is adjusted vertically as the work may require, being clamped in the desired position by means of the handle 45. Section 50 of the lateral extension of the standard is moved in or out to bring the radial or pivotal center 59 thereof above the center or other portion of the anatomical object or to such other position as may be found expedient. Parts 60 and 67 are then adjusted as found necessary, as well as inclination of the tube and yoke 71, in order to bring the end of the tube adjacent or against the object. Such is the flexibility in mounting of the tube that it may be directed at practically any angle toward an object in practically any position and, for example, toward any portion of the patient's head with the latter supported by the head rest of the usual dental chair. With the radial center 59 above the center of a jaw, but a single adjustment, namely, the pivotal movement of part 60, is necessary to swing the tube to various radial positions about the jaw as may be found convenient for directing the rays of light through the different teeth. With the parts adjusted to the desired position, the main switch may be closed by means of handle 94, the time switch set for the desired period of exposure and the exposure begun, after which the switch automatically terminates the exposure. The counterbalanced, flexible character of the tube support and the ease with which the adjustable connections of the latter are manipulated provides for the quick adjustment of the tube to the various positions which may be required for successive exposures, and when use of the apparatus is completed the standard parts may be folded back compactly upon themselves above the cabinet and may be lowered in proximity with the top of the latter so as to occupy a minimum of space, and the cabinet may then be wheeled to some out of the way position. The construction is thus fully self-contained, obviating the provision, location and handling of more than one piece of apparatus and the support of the high tension and other electrical connections on the telescoping standard likewise obviates the provision of fixed elevated posts or other overhead arrangements for carrying the wires. The various parts are simple, strong and durable in form and the inclusion of the mechanical and electrical devices and connections to a maximum extent within the cabinet enhances the ornamental appearance of the apparatus as a whole.

We claim as our invention:

1. A unitary light projecting apparatus comprising a container, electrical operating means therein for said apparatus, an upwardly projecting standard extending at its lower end into said container and supported for extensible movement into and out of the same, movably connected parts carried by said standard and supporting a light source for universal movement, and electrical connections between said light source and said operating means in the container.

2. A unitary light projecting apparatus comprising a container, electrical operating means therein for said apparatus, an upwardly projecting standard extending at its lower end into said container, means located within said container for supporting and counterbalancing said standard for extensible movement into and out of said container, movably connected parts carried by said standard and supporting a light source for universal movement, and electrical connections between said light source and said operating means in the container.

3. A unitary light projecting apparatus comprising a cabinet, electrical devices therein for operating said apparatus, a standard extending substantially vertically through the top of said cabinet, means carried by the cabinet for supporting said standard for telescopic movement into and out of the same, means for counterbalancing the weight of said standard, movably connected parts on said standard supporting a source of light for universal movement, and extensible electrical connections between said light source and said electrical devices in the cabinet carried by said standard for movement therewith.

4. A unitary light projecting apparatus comprising a cabinet provided therein with electrical devices for operating said apparatus, controlling and indicating means for said devices on said cabinet, a standard extending substantially vertically through the top of said cabinet, means carried by said cabinet for supporting said standard for telescopic movement into and out of the same, movably connected parts on said standard and forming therewith an overhanging arm supporting a source of light for universal movement, electrical connections between said light source and said electrical operating devices carried by said standard for movement therewith, reeling means for said connections within the cabinet, and means in the latter for counterbalancing the weight of said standard and associated parts.

5. A unitary light projecting apparatus comprising a cabinet, electrical operating means therein for said apparatus, a standard extending upwardly through said cabinet, supporting and guiding means in the cabinet including cooperating rollers and tracks therefor supporting said standard for telescopic movement into and out of said cabinet, movably connected parts on said standard supporting a source of light for universal movement, extensible electrical connections between said light source and said operating means in the cabinet carried by said standard, and counterbalancing means for said standard and associated parts.

6. A unitary light projecting apparatus comprising a cabinet, a standard within and extending upwardly from the latter and telescopically adjustable into and out of the same, a lateral extension on said standard provided with a radial center adjustable toward and from said standard for location above an object to be illuminated, a part pivotally carried at said radial center and supporting a source of light for adjustment to a plurality of radial positions about said object, electrical operating and controlling devices in said cabinet, and extensible electrical connections between said light source and said devices carried by the standard.

7. A unitary light projecting apparatus comprising a cabinet, a standard within and extending upwardly from the latter and telescopically adjustable into and out of the same, a lateral extension pivotally supported on said standard and provided with a radial center adjustable toward and from the standard for location above an object to be illuminated, a part pivotally carried at said radial center, a second part pivotally carried on said first part for adjustment about a substantially horizontal axis and supporting a source of light for adjustment to a plurality of inclinations in a plurality of radial positions about said object, electrical operating and controlling devices in said cabinet, and extensible electrical connections between said light source and said devices carried by said standard.

8. A unitary light projecting apparatus comprising a cabinet, adapted to contain electrical operating devices for said apparatus, a standard within and extending upwardly from said cabinet and supported for telescopic movement into and out of the same, a lateral extension on said standard provided with a section adjustably supported for movement parallel with said extension and provided with a radial center adapted to be positioned above the center of an object to be illuminated, a part pivotally carried at said radial center for horizontal adjustment about said object, a second part adjustably carried by said first part for movement in a vertical plane and having an arm adjustable about an axis substantially parallel with said second part, and means on said arm for supporting a light source.

9. A unitary light projecting apparatus comprising a cabinet adapted to contain electrical operating devices for said apparatus, a standard within and extending upwardly from said cabinet and supported for telescopic movement into and out of the same, a lateral extension on said standard of adjustable length having a radial center adapted to be positioned above the center of an object to be illuminated, a part pivotally carried at said radial center for horizontal adjustment about said object, a second part adjustably carried by said first part, a frame adjustably supported by said second part, and means for supporting a light source movable on said frame to a plurality of positions adapted for making stereoscopic views of a portion of said object.

10. A unitary light projecting apparatus comprising a cabinet adapted to contain electrical operating devices for said apparatus, a standard within and extending upwardly from said cabinet and supported for telescopic movement into and out of the same, a lateral extension on said standard of adjustable length having a radial center adapted to be positioned above the center of an anatomical object, a part pivotally carried at said radial center for horizontal adjustment about said anatomical center, a second part adjustably carried by said first part, a yoke pivotally supported by said second part, a holder for a light source movable in said yoke to a plurality of positions adapted for making stereoscopic views of a portion of said object and means for retaining said holder in said positions.

11. A unitary light projecting apparatus comprising a cabinet adapted to contain electrical operating devices for said apparatus, a standard within and extending upwardly from said cabinet and supported for telescopic movement into and out of the same, a lateral extension on said standard of adjustable length having a radial center adapted to be positioned above the center of an object to be illuminated, a part pivotally carried at said radial center for horizontal adjustment about said object, a second part adjustably carried by said first part, guide means on said second part formed on an arc adapted to be arranged in substantially concentric relation with a portion of said object, and a holder for a light source movable on said guide means to a plurality of positions adapted for making stereoscopic views of said portion of the object.

12. A unitary light projecting apparatus comprising a cabinet adapted to contain electrical operating devices for said apparatus, a standard within and extending upwardly from said cabinet and supported for telescopic movement into and out of the same, a lateral extension on said standard, movably connected parts carried by said extension for substantially universal adjustment including guide means formed on an arc adapted to be arranged in substantially concentric relation with a portion of an object to be illuminated, and a holder for a light source movable on said guide means to a plurality of positions adapted for making stereoscopic views of said portion of the object.

13. A unitary light projecting apparatus comprising a cabinet, electrical operating devices therein, a standard extending into the cabinet and supported therein for telescopic movement into and out of the same, said standard being arranged to overhang an object to be illuminated, movably connected parts carried by said standard for substantially universal adjustment including guide means formed on an arc adapted to be arranged in substantially concentric relation with a selected portion of said object, a holder for a light source movable on said guide means to a plurality of positions adapted for making stereoscopic views of said selected portion of the object, extensible electrical connections between said light source and said operating devices carried by said standard, and means for counterbalancing the latter.

14. A unitary light projecting apparatus comprising a portable cabinet, electrical operating and controlling devices therein, a standard supported by the cabinet having an extensible portion provided with a radial center adapted to be located above the center of an object to be illuminated, a part pivotally supported at said radial center for horizontal movement about said object, a second part pivotally supported by said first part for adjustment in a vertical plane, guide ways pivotally supported on said second part and formed on an arc adapted to be arranged in substantially concentric relation with a portion of said object, and a holder adapted to support a source of light at the center of gravity of the latter slidable on said guide ways to a plurality of positions adapted for making stereoscopic views of said object.

15. A self-contained X-ray apparatus comprising a portable cabinet provided with an opening in its top, a standard extending upwardly through said opening and movable therein toward and from the cabinet, means in the latter for adjustably supporting and counterbalancing the standard and for clamping the same in adjusted position, parts movably connected with the standard and with one another for universal movement and comprising a forked arm, a substantially rectangular frame pivotally carried by said arm, a holder for supporting an X-ray tube adjacent its center of gravity and slidable in said frame to a plurality of positions adapted for making stereoscopic views of an object, electrical operating devices in said cabinet, an electrical connection between said devices and said tube carried by said standard and said parts for movement therewith and means for maintaining said connection taut during movement of said standard and parts.

16. A unitary light projecting apparatus comprising a container, electrical operating means therein for said apparatus, an upwardly projecting standard longitudinally adjustable on said container, a longitudinally extensible lateral arm swingingly carried adjacent the upper end of said standard, a downwardly projecting arm pivotally supported adjacent the outer end of said lateral arm for movement about a substantially vertical axis and including a plurality of movably connected sections, a light source supported by said sections for universal movement, and electrical connections between said light source and operating means.

17. In a unitary light projecting apparatus, electrical operating means, an upwardly projecting standard, a substantially horizontal arm comprising longitudinally extensible sections pivotally connected with said standard for universal adjustment of the outer end thereof to position the same above an object to be treated, a downwardly extending arm pivotally supported on the outer end of said lateral arm and comprising portions movably connected with one another, a light source carried by said arm portions for universal adjustment about said object, and electrical connections between said light source and operating means.

18. A unitary light projecting apparatus comprising a container, electrical operating means therein for said apparatus, an upwardly projecting standard supported by said container, a longitudinally extensible, vertically adjustable lateral arm swingingly carried on said standard for universal adjustment of its outer end to position the same above an object to be illuminated, an arm pivotally supported on the outer end of said lateral arm for movement about a substantially vertical axis and including movably connected sections, a frame carried by said sections for universal adjustment about said object, a light source adjustable on said frame to a plurality of positions for making stereoscopic views of said object, and electrical connections between said operating means and light source.

19. In a unitary light projecting apparatus, upwardly projecting supporting means, a vertically adjustable lateral arm comprising longitudinally extensible sections having a pivotal connection with said means affording universal adjustment of the outer end of said arm above an object to be treated, a downwardly projecting arm having a pivotal connection with the outer end of said lateral arm for movement about a substantially vertical axis and comprising a pivotally connected part, a branching arm pivotally connected with said part, and a light source pivotally carried by said branching arm for universal adjustment about said object.

20. A unitary light projecting apparatus comprising an upwardly extending standard, a longitudinally extensible vertically adjustable lateral arm swingingly supported on said standard for universal adjustment of its outer end to position the same above an object to be illuminated, a downwardly extending arm pivotally supported on the outer end of said lateral arm for movement about a substantially vertical axis and including a plurality of sections pivotally connected with each other for relative adjustment about substantially perpendicular axes, a frame carried by said sections for universal adjustment about said object and provided with arcuate guides, and a light source supported for movement on said guides to a plurality of positions for making stereoscopic views of said object.

21. A unitary light projecting apparatus comprising supporting means, a lateral arm having a connection with said means affording universal movement of its outer end to position the same above an object to be illuminated, a downwardly extending arm pivotally supported on the outer end of said lateral arm and including a plurality of movably connected sections, a frame carried by said sections for universal adjustment about said object and provided with arcuate guides, and a light source supported for movement on said guides to a plurality of positions for making stereoscopic views of said object.

22. A unitary light projecting apparatus comprising upwardly extending supporting means, a lateral arm having a connection with said means affording universal movement of its outer end to position the same above an object to be illuminated, a downwardly extending arm pivotally supported on the outer end of said lateral arm and including a plurality of movably connected sections terminating in a forked end, a frame pivotally carried in the forked end of said sections for universal movement about said object and provided with arcuate guides, and a light source supported for movement on said guides to a plurality of positions for making stereoscopic views of said object.

23. A unitary light projecting apparatus comprising an upwardly extending standard, a lateral arm connected with said standard by means affording universal movement of its outer end to position the same above an object to be illuminated, a downwardly extending arm pivotally supported on the outer end of said lateral arm and including a plurality of sections movably connected with each other for universal adjustment, a yoke carried at the extremity of said sections and provided with arcuate guides, a plate slidable in the yoke on said guides, means for securing said plate in adjusted positions on the guides, and a light source carried by said plate.

24. A unitary light projecting apparatus comprising a standard provided with an arm including a plurality of sections having connections with one another providing for universal adjustment about an object to be illuminated, a yoke carried by said arm formed with arcuate guides, a plate slidably carried in said yoke on said guides, detent means connecting said yoke and plate for securing the latter in adjusted position on said guides, and a light source carried by said plate.

25. A unitary light projecting apparatus comprising a cabinet, electrical operating means therein for said apparatus, an upwardly projecting standard, a substantially horizontal, longitudinally extensible arm swingingly carried by said standard for adjustment of its outer end to position above an object to be illuminated, a part pivoted on the outer end of said arm for movement about a substantially vertical axis and having a downwardly turned end, a forked arm adjustably supported by said part end, an X-ray tube pivotally supported between the branches of said arm and adjustable about said axis to various radial positions relative to said object and electrical connections between said tube and operating means.

26. A unitary light projecting apparatus comprising a cabinet and a standard adapted to be positioned beside a dental chair, electrical operating means in said cabinet, a substantially horizontal arm adjustably carried by said standard and adapted to overhang the chair with its outer end centered above the patient's head, a part pivoted to swing about a vertical axis on the outer end of said arm and having a downwardly turned end, a forked arm adjustably carried by said part end, an X-ray tube pivotally supported between the branches of said arm and adjustable about said axis to various radial positions relative to the patient's head, an electrical conductor connecting said tube with said operating means in the cabinet, and posts on said horizontal arm and part supporting said conductor in spaced relation above the same at a substantial distance from the patient.

27. A unitary light projecting apparatus comprising an upwardly projecting standard, a substantially horizontal telescopically extensible arm adjustably carried thereby for movement of its outer end to center the same above an object to be illuminated, an angular arm pivotally supported to swing about a vertical axis at the outer end of said horizontal arm and having a downwardly turned end, a part pivoted to swing about a substantially horizontal axis on said downturned end, a forked arm pivoted on said part for movement about an axis substantially perpedicular to said horizontal axis, and an X-ray tube pivoted between the branches of said arm and adjustable about said horizontal axis to various radial positions relative to said object.

OSCAR H. PIEPER.
ALPHONSE F. PIEPER.